INVENTOR.
John H. Klok
ATTORNEY

INVENTOR.
John H. Klok

ATTORNEY

INVENTOR.
BY John H. Klok
ATTORNEY

United States Patent Office 3,492,727
Patented Feb. 3, 1970

3,492,727
DRAFTING EQUIPMENT FOR USE IN PREPARING PERSPECTIVE DRAWINGS
John H. Klok, 258 Madison Ave. S.E., Grand Rapids, Mich. 49503
Continuation of application Ser. No. 662,704, Aug. 23, 1967. This application Feb. 7, 1969, Ser. No. 800,345
Int. Cl. B43l 13/14
U.S. Cl. 33—77                    6 Claims

ABSTRACT OF THE DISCLOSURE

A draftsman's board and square for use in making perspective drawings, the board having means for orienting the square to particular vanishing points related to a particular station, or viewing point. The board has scale markings indicating distances toward the vanishing points and above and below a horizon connecting the vanishing points, the distances being related to true measure on an image in a predetermined position.

SUMMARY OF THE INVENTION

This application is a continuation of my copending application for United States patent Ser. No. 662,704, filed Aug. 23, 1967, now abandoned which is in turn a continuation-in-part of my copending application for United States patent Ser. No. 537,971, filed Mar. 28, 1966, now abandoned.

This invention provides a set of related items of equipment for use in the preparation of perspective drawings according to accepted principles of perspective projection. The illusion of depth is obtainable on a two-dimension sheet through the technique of extending the lines in a converging manner to selected "vanishing" points disposed on a "horizon" line. The features characterizing this invention center in the provision of groups of scales which are interrelated with particular vanishing points, viewing points, and object position so that a ruling arm laid to the vanishing point will read on a particular scale the position of any line or point with respect to a scale origin, with correct interrelated foreshortening. In the preferred form of the invention, one of the vanishing points is disposed outside of the margin of the board through the use of an arcuate surface positioning the head of a T square with the ruling edge radial with respect to this outside vanishing point. A second vanishing point on the opposite side of the preferred board is within the board surface, and the combination of this disposition of the two vanishing points is related to a particular object disposition and viewing point to produce the most compact board for a given scope of the scales. The invention makes possible the construction of scales on the face of the board which are related to true measurement along the various dimensions of the object in the selected position. The perspective drawings constructed through the use of these scales are foreshortened in proper relationship to the angles to which the lines recede from the plane of projection, or "picture plane." The advantages of the scale arrangement are primarily twofold: (a) to minimize the amount of work necessary in locating the various points determining the lines of a perspective drawing, and (b) preserving the correct relationship of the distances along the converging lines, and heights at various positions, to minimize distortion.

DETAILED DESCRIPTION

The several features of the invention will be analyzed in detail through a discussion of the particular embodiment illustrated in the accompanying drawings. In the drawings.

The general use of single and multiple vanishing points in the preparation of perspective drawings, and the establishment of these vanishing points by arcuate surfaces engaging the head of a T-square, or by pins engaging the surface of the board, is well-known, and illustrated in a number of patents. Examples of these are the following: 1,591,380, E. F. Harmer, July 6, 1926; 1,969,758, W. R. McCoy, Aug. 14, 1934; 2,412,194, G. D. Anderson et al., Dec. 10, 1946; 2,768,444, J. E. Gaut et al., Oct. 30, 1956; 3,159,918, O. A. Olson et al., Dec. 8, 1964; 236,261 (German), Silberman, in July 11, 1911; 746,331 (British), Suzuki, Mar. 14, 1956.

Figure 1:
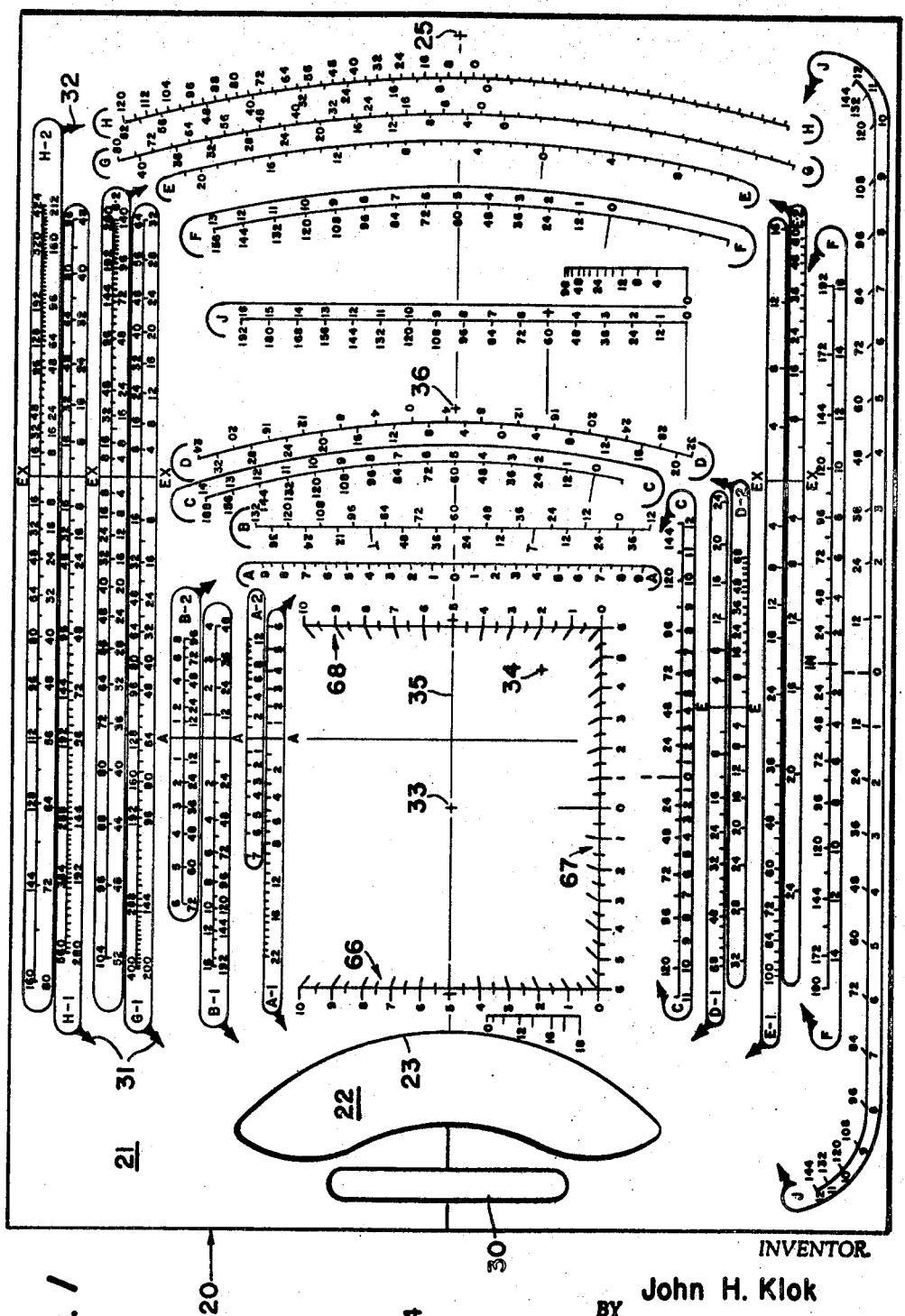
FIGURE 1 is a plan view of the preferred form of a drawing board incorporating the present invention.

It has been recognized that scales giving some indication along the lines converging to a vanishing point are very useful, but the development of these scales has fallen short of providing an interrelated set of scales for a selected object position that can be read directly, and permit the construction of essentially distortion-free drawings. The use of scales reading along the arm of the square are practically useless because of the changing angular relationships involved. In FIGURE 1, the board generally indicated at 20 has a face 21 intersected by a recess 22 providing the arcuate surface 23 having a center of curvature at the point indicated at 24 to establish a "left vanishing point" associated with certain of the scales on the face 21. A "right vanishing point" is indicated at 25, which is within the area of the face 21, and is in the form of a hole for receiving a removable pin. The pin becomes a means for orienting a straight edge to the vanishing point. The length of the arm 26 of the straight edge 27 is such that the vanishing point 25 is disposed just outside of the area swept by the arm 26, with the head 28 of the T-square in engagement with the arcuate surface 23. It should be noted that the upper edge 29 of the arm 26 may be termed the "ruling" edge, and is disposed radially with respect to the vanishing point 24. This necessarily results in a somewhat eccentric relationship of the head 28 with respect to the arm 26, which is a well-known arrangement. Preferably, the board should also include a recess 30 for receiving pencils, erasers, and other items which might slide off if the board were inclined in the usual attitude. This recess is preferably located outside the sweep of the square 27, to avoid interference.

For convenience, the scales appearing on the face 21 are provided with arrows, as shown at 31 and 32 as indication of the association of a particular scale with the vanishing points 24 or 25. A central vanishing point 33 is provided for use in making single-point perspective drawings, and a second central vanishing point 34 is associated with scales for making larger size single-point perspective drawings The line 35, which is drawn through the vanishing points 24 and 25, may be considered as a "horizon" line. The vanishing point 36 may be considered as performing a function similar to the vanishing point 25. The point 36 is associated with the A, B, C, and D scales, while the vanishing point 25 is associated with the E, F, G and H scales. These scales differ primarily in the size of the drawing produced with respect to the measurements used, and whether they are primarily convenient for exterior or interior views. An index of these scales, and their primary utility, as follows:

| | |
|---|---|
| A | Exterior height scale, 1″ to 1″. |
| A-1 | Exterior width scale, 1″ to 1″. |
| A-2 | Exterior depth scale, 1″ to 1″. |
| B | Exterior height scale, 1½″ to 1′. |
| B-1 | Exterior width scale, 1½″ to 1′. |
| B-2 | Exterior depth scale, 1½″ to 1′. |
| C | Interior height and width-depth scales, 1½″ to 1′. |
| D | Exterior height scale, ⅜″ to 1′. |
| D-1 | Exterior width scale, ⅜″ to 1′. |
| D-2 | Exterior depth scale, ⅜″ to 1′. |
| E | Exterior height scale, ¾″ to 1′. |
| E-1 | Exterior width scale, ¾″ to 1′. |
| E-2 | Exterior depth scale ¾″ to 1′. |
| F | Interior height and width-depth scales, 1½″ to 1′. |
| G | Exterior height scale, 3/16″ and ⅜″ to 1′. |
| G-1 | Exterior width scale, 3/16″ and ⅜″ to 1′. |
| G-2 | Exterior height scale, ⅛″ and ¼″ to 1′. |
| H | Exterior depth scale, 3/16″ and ⅜″ to 1′. |
| H-1 | Exterior width scale, ⅛″ and ¼″ to 1′. |
| H-2 | Exterior depth scale, ⅛″ and ¼″ to 1′. |
| J | Height and width-depth scales for one point perspective. |

Figure 2:
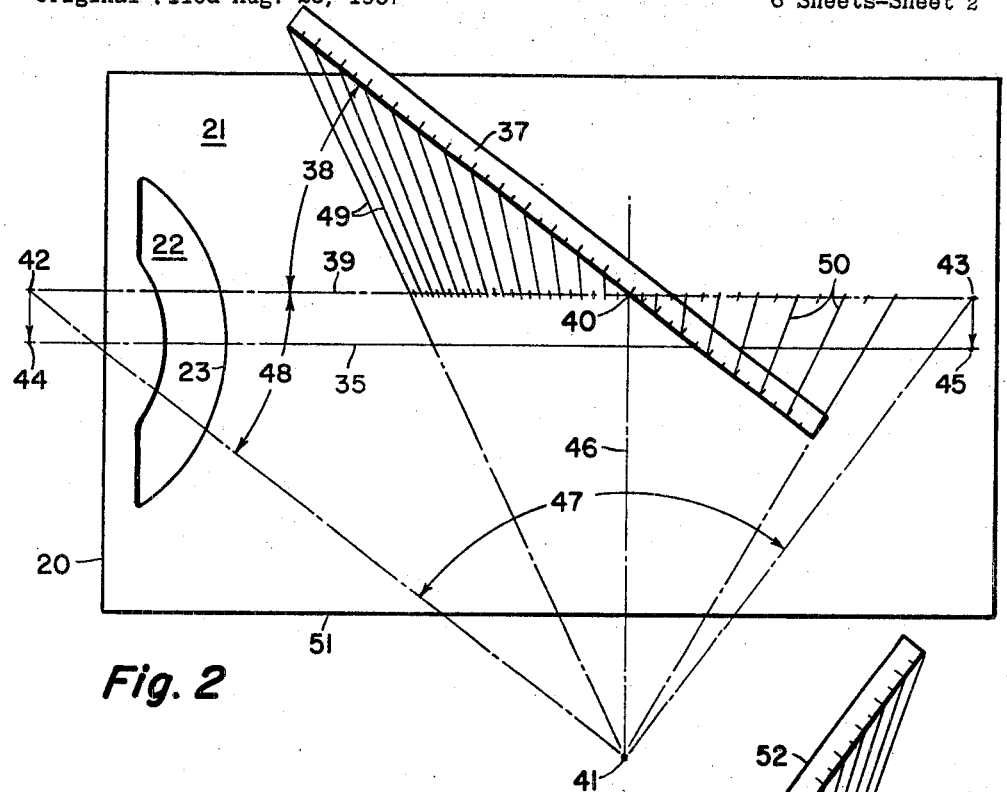
FIGURE 2 is a schematic view illustrating the development of a width scale for an object in a predetermined position with respect to a viewing point.
Figure 3:
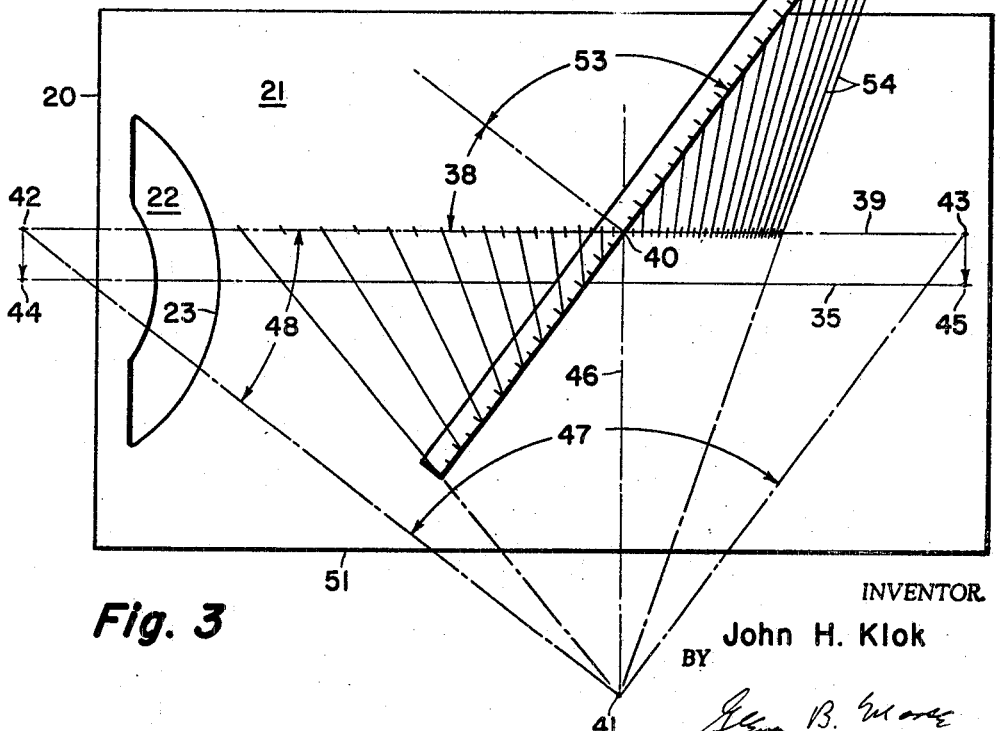
FIGURE 3 is a schematic view illustrating the development of a depth scale for an object in the position of FIGURE 2.

The development of these scales to produce direct readability without distortion is illustrated in the several views of the drawings. FIGURES 2 and 3 are associated with the width and depth scales of two-point perspective drawings from a predetermined viewing point and orientation of the object. These two views may be considered as illustrating the development of all of the width-depth scales in FIGURE 1, these differing from each other primarily with regard to the size relationship of the views with respect to the measurement indicia. FIGURE 2, while simple in its appearance, is a rather complex overlay of plan and elevation diagrams. The selected scale path 37 may be considered as a plan view of a scale of true measurement laid along the edge of a three dimensional object; and as such, is an orientation line of true measurement oriented by the angle 38 with respect to a vertical plane having the trace 39 on a horizontal plane. The corner of the object is at the point 40, which may be considered as the origin of the scale of true measure laid along the path 37. The plane showing the trace 39 is commonly referred to as the "picture plane", and is the plane on which the object represented by the scale path 37 is projected from the viewing point 41. To this point, the description has dealt with what is essentially a plan view. The line 35, however, is both a horizon line (related to the viewing point), which has meaning in elevation, and also a trace of vertical plane parallel to the picture plane. This plane is in front of the picture plane by the distance between the lines 39 and 35. The arbitrary vanishing points of the perspective system appear on the picture plane (whose trace is 39) at the points 42 and 43 as projections from the viewing point 41, and these points are projected perpendicularly to the horizon line at 44 and 45, respectively. The projections of the vanishing points on the horizon line are the points most usually referred to as the "vanishing points." The vertical plane through the line 35 becomes a reference plane in depth set forward from the object and from which all lines recede toward the vanishing points in space.

A line 46 extends from the origin 40 in a direction perpendicular to the picture plane trace 39 and the horizon line 35, and contains the viewing point 41. The placement of the point 41 on the line 46 is such that the angle 47 is 90 degrees. With this arrangement, vertical lines through the point 40 (representing the vertical edge of an object) will all properly converge at the vanishing points 42 and 43 on the picture plane 39; and if a scale of true measurement be erected vertically at the point 40, the convergence between the width-depth scales represented by the scale path 37 and height scales will be correctly related to produce freedom from distortion. As long as this relationship between the points 41, 42 and 43 is maintained, the orientation angle 38 of the three dimensional object may be the same or different from the angle 48, according to the draftsman's choice. In other words, it is not necessary that the scale path be parallel to the line 41–42.

Once the relationship of these various lines of the schematic diagram of FIGURE 2 are clearly understood, the procedure for developing the width-depth scales for the board 20 is very simple. Lines 49 are drawn from the various indicia on the scale path 37 to the viewing point 41. Wherever these lines intersect a reference line parallel to the horizon line 35 (as it appears on the board), the points of intersection are noted, and are labeled corresponding to the indices of the scale of true measurement on the path 37. Because of the triangular relationships involved, the line 39 (which is also the trace of the vertical picture plane) may be replaced by any line parallel to the line 35. Such change in placement will not effect the readings, as long as the readings indicate intersections with the lines 49. It is very significant to note that this arrangement for developing the width-depth scales makes it possible to use measurements on both sides of the picture plane 39, as the scale path 37 may be considered as intersection this plane. Measurements on both sides can be made through the use of marks made at the intersection of lines 50 drawn from the viewing point 41 to the indicia on the scale of true measurement 37 on the right side of the line 46, in the same manner as previously described for the left side. It is highly preferable that the edge 51 of the board 20 be parallel to the line 39, so that a square may be laid to the edge 51 in position to intersect a desired marking on the scale developed along the line 39 for transferring points on the scale to the central board surface.

Essentially the same procedure is followed in the development of the depth scale according to the diagram shown in FIGURE 3. The path 52 of a scale of true measurement is laid along the angle 53 with respect to the scale path 37. The angle 53 is 90 degrees. The origin point 40 on the scale is located in the same manner as described in connection with FIGURE 2, and the remaining significant points in the diagram are the same in both figures. The lines 54 drawn from the viewing point 41 to the indicia on the scale of true measurement along the path 52 intersect the reference line 39 at points which become the depth scale for the three dimensional object oriented in the selected manner. As with the width scale, this arrangement for scale development permits measurements to be taken on either side of the origin 40.

Figure 4:
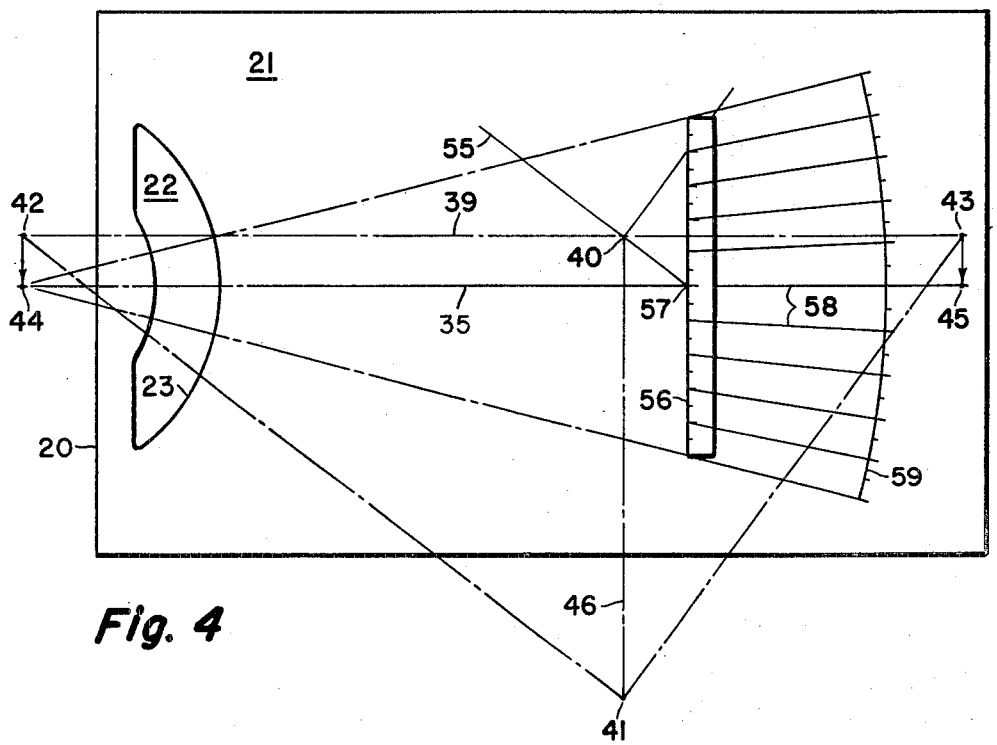
FIGURE 4 is a schematic view illustrating the development of a height scale for an object in the same position as that of FIGURES 2 and 3.
Figure 5:
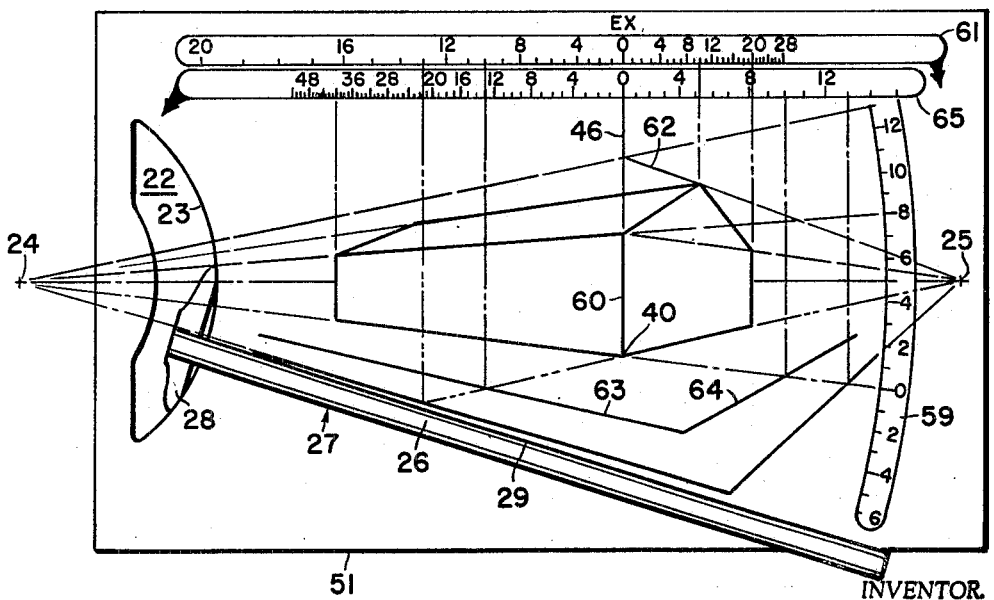
FIGURE 5 illustrates the manner of preparing the perspective drawing utilizing the scales developed in FIGURES 2, 3 and 4.

The height scale development shown in FIGURE 4 is also based on the same object orientation, as indicated by the line 55. This line corresponds to the scale path 37, and would normally be the lower edge of the three dimensional object. Since it is desirable to correlate the scale measurements in width, depth and height, it becomes necessary to place the reference scale of true measurement for height in the correct position where true measurement will appear on the projection drawing. This requires the scale path 56 (true measurement) to be erected at the point 57, which is the intersection of the line 55 with the horizon line 35. As previously noted, line 35 is also the trace on a horizontal plane of the vertical plane from which all lines converge to the vanishing points. This plane is therefore the only place where true unconverged height measurements may be referred. The scale path 56 is disposed perpendicular to the horizon line 35, and lines 58 drawn through the indicia on the scale of true measurement 56 to the point 44, which is the projection of the vanishing point on the horizon line, will intercept any desired scale path 59 at points which can be labeled according to the intersected indicia on the scale of true measurement 56. The path 59 may be either straight or arcuate, as desired. FIGURE 5 shows the manner in which the scales developed in FIGURES 2, 3 and 4 are used. For convenience, the vanishing points developed in the course of the discussion of the schematic diagram are separately numbered from those on FIGURES 1 and 5. The term "vanishing point" will be used to identify the points as projected on the horizon line. The vanishing point 24 in FIGURE 5 is the same as the vanishing point 44 of the schematic diagrams of FIGURES 2, 3 and 4, and the vanishing point 25 corresponds to the point 45 of those diagrams. Measurements in heights along the scale 59 correspond to heights at the line labeled "EX" on the board, which corresponds to the line 46.

If the building represented by the original object happens to be of a certain height at the peak, and assuming that the corner 60 is placed at the point 40 of the schematic diagrams, the square 26 is placed with the ruling edge 29 at the marking on the scale path 59 corresponding to the height of the building at the peak. The intersection of the ruling edge with the line 46 is marked, and it is known that the peak of the roof will be on a line extending from that point to the vanishing point 25. Half the width of the building is then located on the depth scale 61 of FIGURE 5, and the square is then held against the lower edge 51 so that the ruling edge crosses the scale 61 at the desired point. The intersection of that line with the line 62 locates the peak of the roof. This procedure is followed throughout the preparation of the perspective drawing. A sidewalk or patio area surrounding the building is easily drawn with the lines 63 and 64, making use of the fact that the scales for width and depth extend on both sides of the origin point 40. The measurements on the building to the left of the line 60 make use of the scale 65. The scale 61 is typical of all the depth scales on the complete board in FIGURE 1, and the scale 65 is illustrative of the width scales. Height scales associated with the vanishing points 24 and 25 are prepared in a manner similar to the scale 59, although the arcuate pattern of the scale path is optional.

Figure 6:
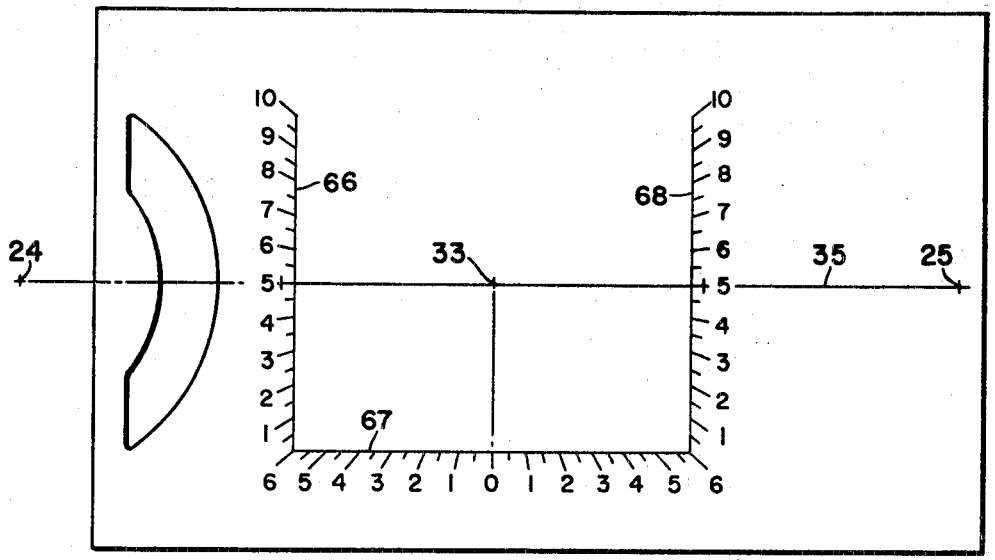
FIGURE 6 is a plan view illustrating the placement of width and height scales for perspective views utilizing a single vanishing point.
Figure 7:
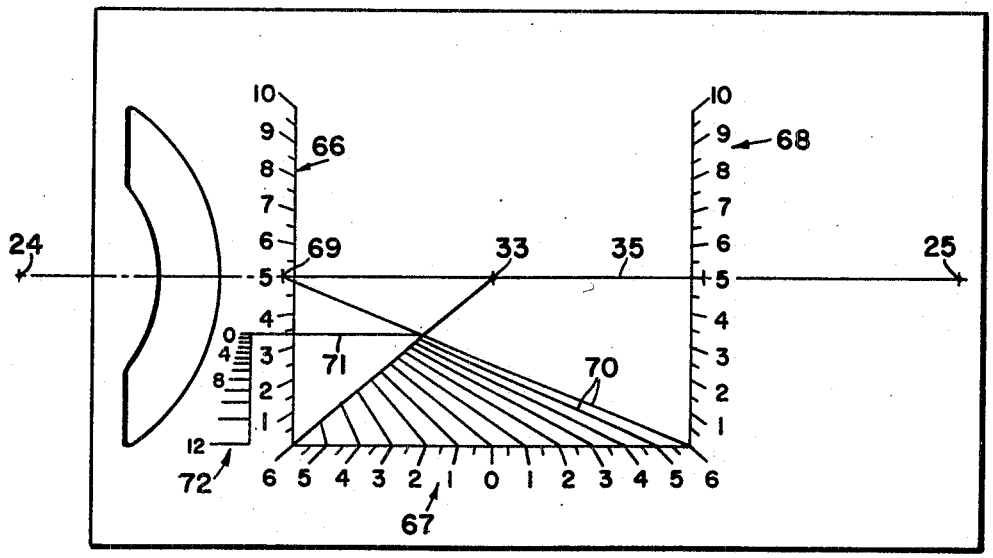
FIGURE 7 is a schematic illustration showing the development of a depth scale for the scale arrangements illustrated in FIGURE 6.
Figure 8:
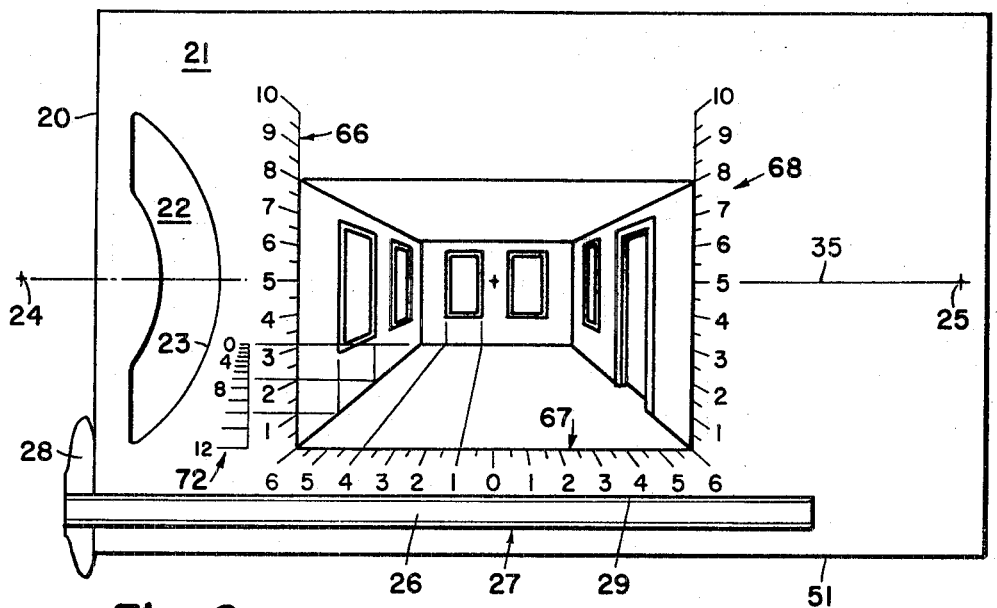
FIGURE 8 illustrates the manner in which the scales of FIGURES 6 and 7 are utilized in making an interior perspective drawing.

FIGURE 6 shows the development of the scales 66, 67 and 68 of FIGURE 1 which are related to the single vanishing point 33. These scales are laid in a rectangular pattern, using as a reference line (usually for interior drawings) the juncture of the floor and opposite walls of a room. This juncture becomes the origin for the height scales 66 and 68, which are perpendicular to the width scale 67. Indicia on these scales are all related to marks which are drawn to the vanishing point 33. The depth scale associated with the scales 66–68 is developed as shown in FIGURE 7. An arbitrary point 69 is selected on the horizon line 35, and a line from the right-hand height scale origin is drawn to it. Similar lines 70 are drawn from indicia on the width scale 67 to the point 69, and the intersection of these with a line from the left height scale origin to the vanishing point 33 is noted. Horizontal lines 71 drawn to a selected scale path 72 produce a scale which may be numbered to indicate measurement in depth. FIGURE 8 shows the manner in which these scales shown in FIGURES 6 and 7 are used to draw the interior of a room. Depth measurements are projected from the base line (height scale origin to the point 33) to the desired height.

Figure 9:
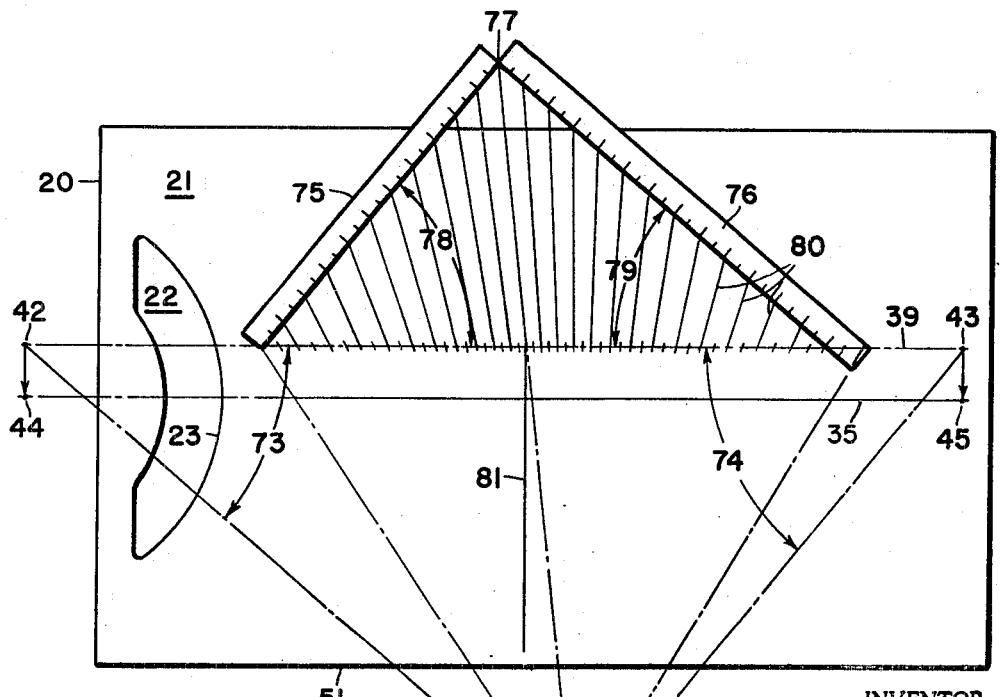
FIGURE 9 is a schematic illustration showing the development of width-depth scales for interior perspective drawings utilizing two vanishing points.

FIGURE 9 illustrates the development of width-depth scales for interior perspective views utilizing two vanishing points. As in FIGURES 2 and 3, the points 42 and 43 represent the projections on the so-called "picture plane" of the vanishing points in space, and these are projected to the horizon line 35 at the points 44 and 45. The viewing point 41 is positioned so that the angle 42–41–43 is 90 degrees, with the result that the angles 73 and 74 total 90 degrees. The scale paths 75 and 76 are laid at 90 degrees with respect to each other, representing the intersection of a floor and wall, that meet at 90 degrees at the corner 77 (of the object). The angles 78 and 79 will therefore also total to 90 degrees. Lines 80 are drawn from the viewing point 41 to the indicia on scales of true measurement laid along the paths 75 and 76, and the intersection of these with the trace 39 of the picture plane (or with a line parallel to the trace 39) establishes the width-depth scales, the numbered intersections corresponding to the indicia from which the lines are drawn. The line drawn to the corner 77 establishes the position of the height reference line 81 as it indicates the point where the corner 77 is projected from the viewing point to the picture plane and to the plane of the trace 35. Scale readings for height are transferred to this line, and then along the lines to the opposite vanishing points.

Figure 10:
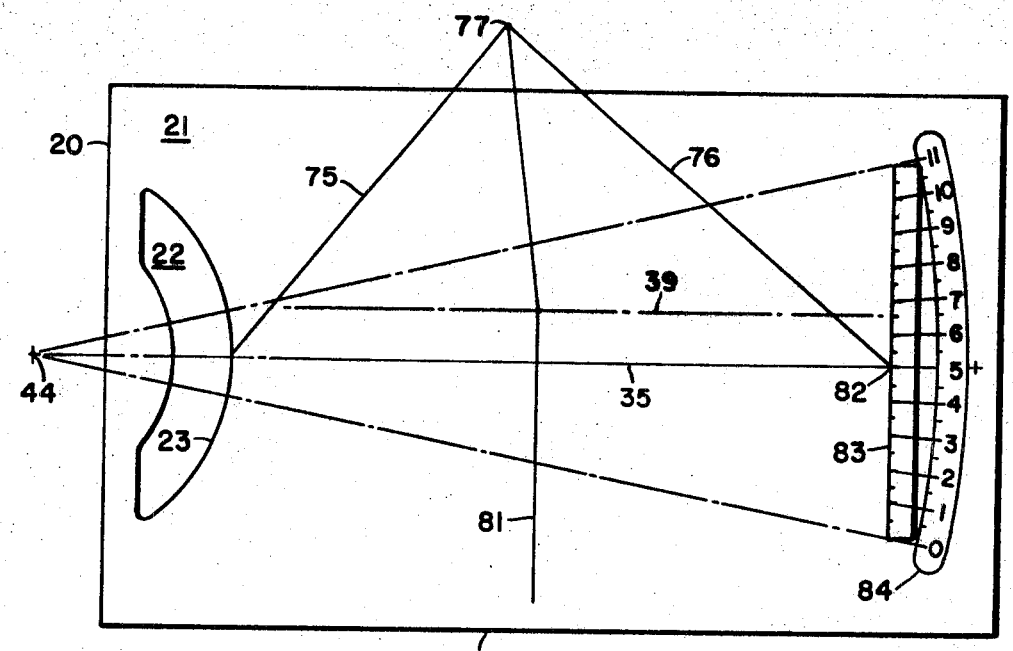
FIGURE 10 is a schematic view illustrating the development of a height scale associated with the scales shown in FIGURE 9.
Figure 11:
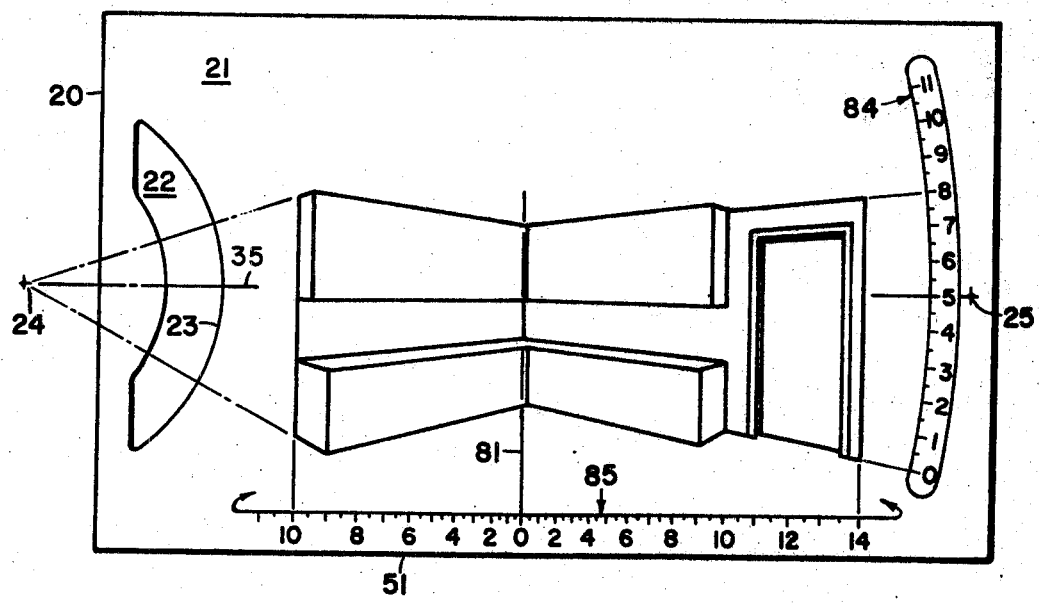
FIGURE 11 shows the manner of utilizing the scales developed in FIGURES 9 and 10 in the preparation of an interior perspective drawing.

FIGURE 10 illustrates the manner in which the height scales are developed in conjunction with the width-depth scales of FIGURE 9. The scale path 76 is continued down to the point of intersection with the horizon line 35 at the point 82. The scale of true measurement 83 is erected at that point in a position perpendicular to the horizon line 35, and lines through the indicia on this scale are extended from the vanishing point 44 to a convenient scale path 84. Markings are then made on this scale path corresponding to the indicia intersected on the scale of true measurement. The T-square 27 can then be moved to various positions in which the head 28 engages the arcuate surface 23, and the intersection of the ruling edge 29 with the scale 84 becomes a height measure referable to the line 81. FIGURE 11 shows the manner in which the scales developed in FIGURES 9 and 10 are used. The scale appearing on the line 39 of FIGURE 9 is transferred down to the lower part of the board (with parallel vertical lines) to become the width-depth scale 85. The various corners and edges of the walls, door and cabinet can be located through the use of the scales 84 and 85 in the manner indicated. As with the other height scales, the height readings are with respect to the selected vanishing point. Heights in the other direction are simply run out from points of intersection, with lines running from these points to the opposite vanishing point.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. A board for constructiing drawings of various types of two point perspective views comprising:

indicia on the board defining a plurality of aligned spaced vanishing points at least one of which is adjacent one side of the board and at least one other of which is intermediate the board;

means on the board defining another vanishing point adjacent the other side of the board in linear alignment with the plurality of vanishing points and separated therefrom;

at least one set of first scales of indicia on the board associated with the one vanishing point and the another vanishing point, one of the first scales indicating distances toward the associated vanishing points, another of the first scales extending above and below the trace of the vanishing points for indicating heights above and below a horizon; and at least one set of second scales of indicia on the board associated with the one other vanishing point and the another vanishing point, one of the second scales indicating distances toward the associated vanishing points, another of the second scales extending above and below the trace of the vanishing points for indicating height above and below a horizon.

2. The board of claim 1 wherein the means defining the another vanishing point comprises positioning means for arcuately orienting a straight edge with respect to the another vanishing point.

3. The board of claim 1 wherein the one of the first scales comprises a first portion extending generally toward the one of the plurality of vanishing points and a second portion extending generally toward the another vanishing point and the one of the second scales comprises a first portion extending generally toward the one other vanishing point and a second portion extending generally toward the another vanishing point.

4. The board of claim 3 wherein the first and second portions of the first and second scales reside generally parallel to the trace of the vanishing points.

5. The board of claim 1 further comprising means for constructing drawings of various types of one point perspective views, comprising:

indicia on the board defining a second plurality of spaced vanishing points;

at least one set of third scales of indicia on the board associated with one of the second plurality of vanishing points, one of the third scales indicating distances perpendicular to a horizontal, another of the third scales indicating distances along the horizontal; and at least one set of fourth scales of indicia on the board associated with another of the second plurality of vanishing points, one of the fourth scales indicating distances perpendicular to a horizontal, another of the fourth scales indicating distances along the horizontal.

6. An arrangement for constructing perspective drawings comprising:

a square having a head and a straight edge arm;

a board comprising:

indicia on the board defining a plurality of spaced vanishing points at least one of which is adjacent one side of the board and;

positioning means for orienting the straight edge on the board including:

an arcuate surface on the board adjacent the other side thereof defining another of said spaced vanishing points, the arcuate surface being engageable with the head of the square for orienting the straight edge arm in a radial attitude with respect to the said another vanishing point; and a pin engaging a hole at a point outside the area swept by the arm of the square when the head thereof is in engagement with the arcuate surface; and at least one set of scales of indicia on the board associated with one vanishing point and the another vanishing point, one of the scales indicating distances toward the associated vanishing points, another of the scales extending above and below the trace of the vanishing points for indicating heights above and below a horizon.

References Cited

UNITED STATES PATENTS

| 1,591,380 | 7/1926 | Harmer | 33—77 |
| 2,412,194 | 12/1946 | Anderson | 33—77 |
| 2,876,547 | 3/1959 | Spencer et al. | 33—77 |

FOREIGN PATENTS

| 746,331 | 3/1956 | Great Britain. |

HARRY N. HAROIAN, Primary Examiner